May 15, 1934.  E. A. SPERRY, JR  1,959,141
BORE HOLE POSITION INDICATOR
Filed April 15, 1929   2 Sheets-Sheet 1
Fig. 2.  Fig. 4.  Fig. 1.
Fig. 3.
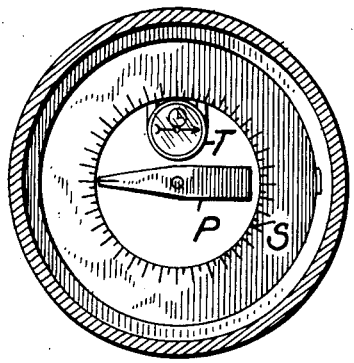
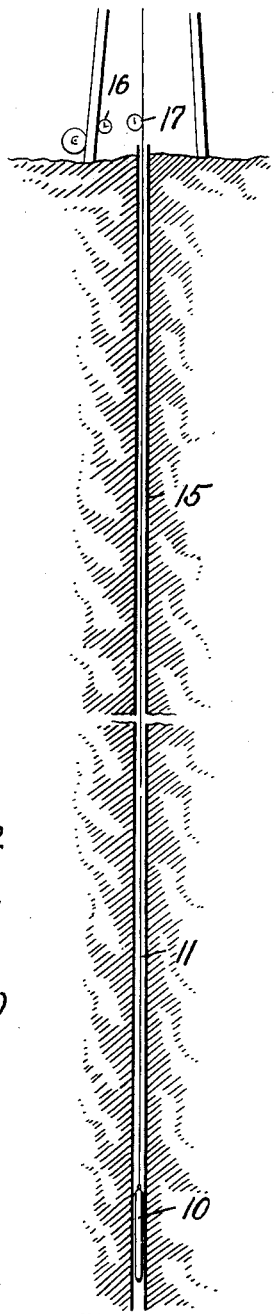
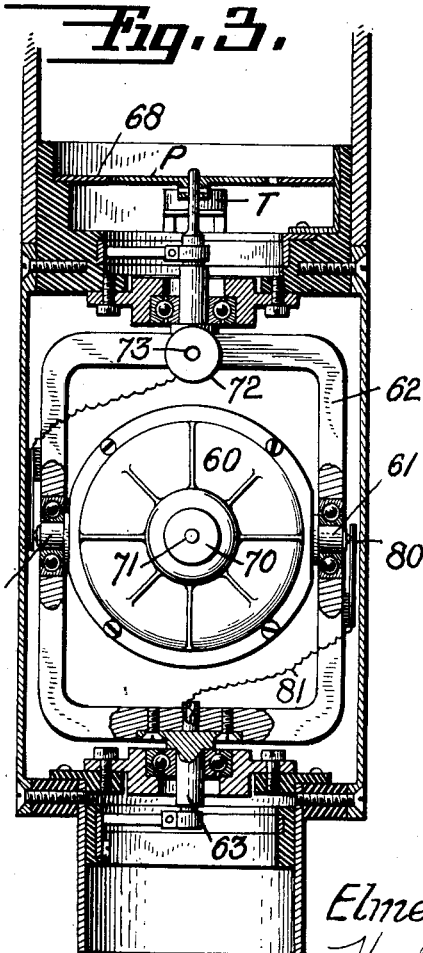
INVENTOR
Elmer A. Sperry, Jr.
BY
Herbert N. Thompson
his ATTORNEY.

May 15, 1934.  E. A. SPERRY, JR  1,959,141
BORE HOLE POSITION INDICATOR
Filed April 15, 1929   2 Sheets-Sheet 2
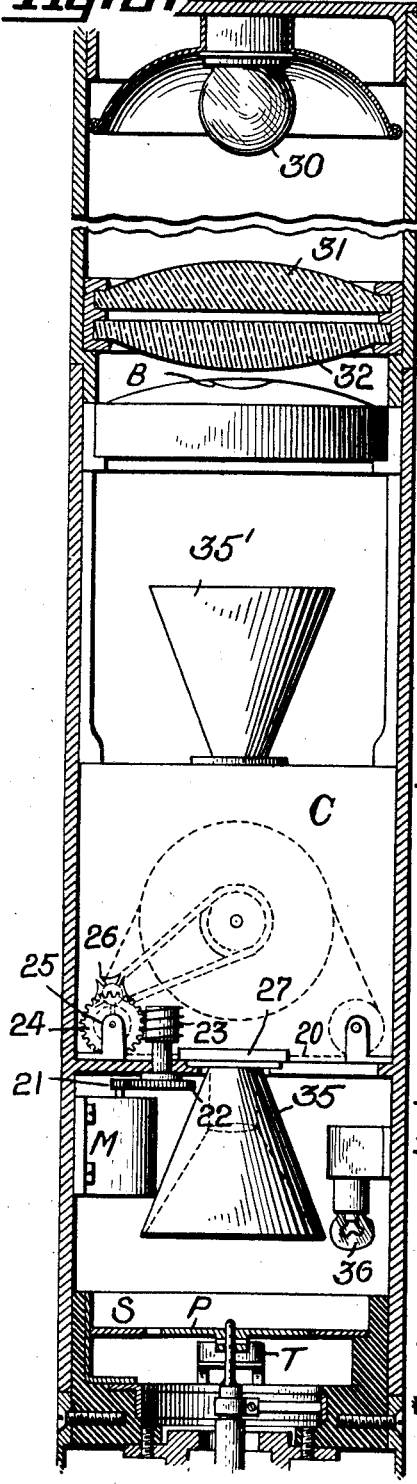
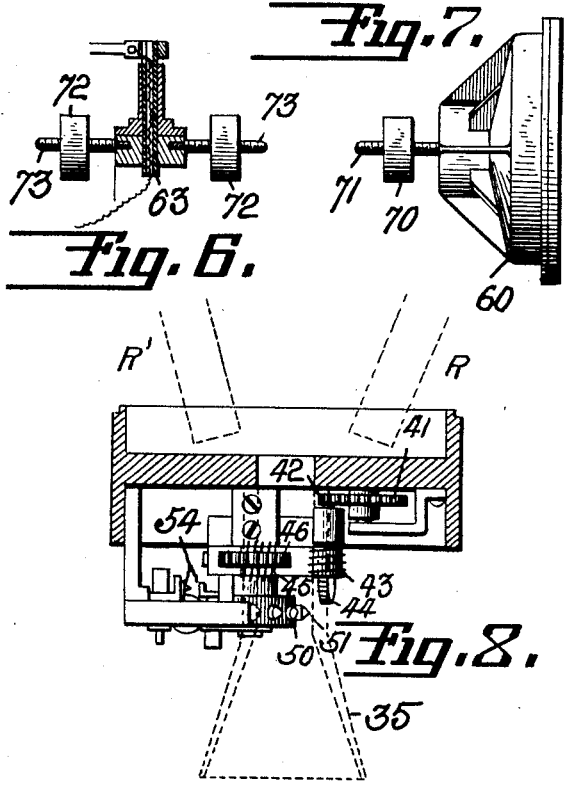
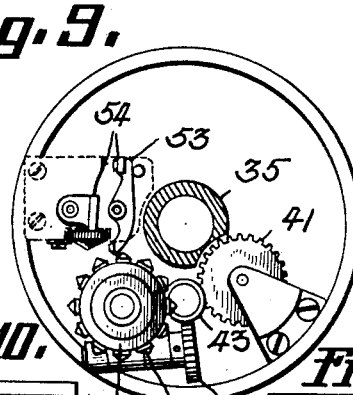
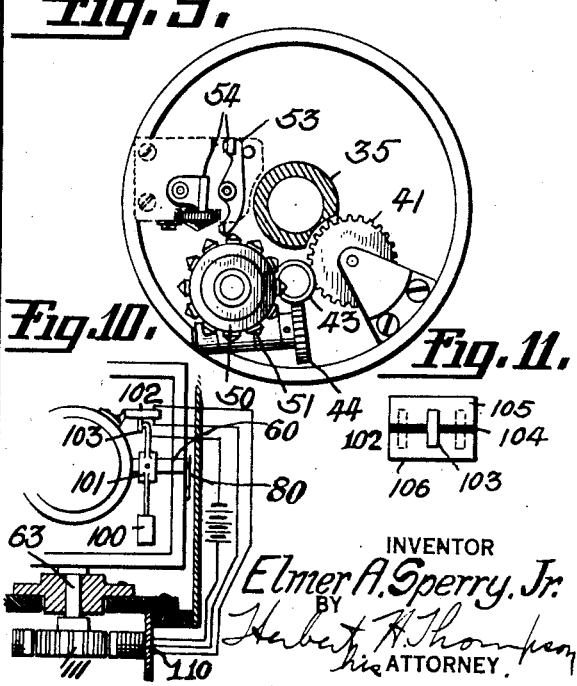
INVENTOR
Elmer A. Sperry, Jr.
BY
Herbert H. Thompson
his ATTORNEY Patented May 15, 1934

1,959,141

UNITED STATES PATENT OFFICE 1,959,141

BORE-HOLE POSITION INDICATOR

Elmer A. Sperry, Jr., Brooklyn, N. Y., assignor to Sperry Gyroscope Company, Inc., Brooklyn N. Y., a corporation of New York, Application April 15, 1929, Serial No. 355,088

4 Claims. (Cl. 234—5.3)

This invention relates to bore-hole position recorders of the type designed to give indications of both inclination of the bore-hole with respect to the vertical and also the direction in azimuth which the bore-hole may assume. It is the principal object of my invention to provide a novel method and apparatus for securing such indications and this method may be stated briefly as comprising the recording of inclination and azimuth by apparatus within the bore-hole and by noting the depth by apparatus outside the bore-hole, together with synchronized timing mechanism within and without the bore-hole. Thus in one embodiment of my invention I make a record simultaneously and at periodic intervals of inclination, position in azimuth, and time, by the apparatus within the bore-hole, and note depth and time by apparatus outside the bore-hole.

Another object of this invention is the provision of suitable direction indicating means, in this case in the form of a gyroscopic baseline so designed that it is substantially free of error arising in the time interval during which the record is made.

Another object of this invention is the provision of a bore-hole indicating apparatus which is capable of very rapid manipulation to permit a rapid descent of the apparatus within the bore-hole.

Further objects and advantages of this invention will become apparent in the following detailed description thereof.

In the accompanying drawings;

Fig. 1 is an assembly view showing my invention as it is applied to a bore-hole from a position on the surface.

Fig. 2 is a vertical section through the casing enclosing the testing apparatus.

Fig. 3 is a vertical section through the direction and time indicating mechanisms.

Fig. 4 is a plan view of the indicating instruments shown in Fig. 3.

Fig. 5 is a vertical section through that portion of the testing apparatus which provides at predetermined intervals a simultaneous record of direction, inclination and time.

Fig. 6 is a vertical section through the upper bearing of the vertical ring supporting the gyro of Fig. 3.

Fig. 7 is an elevation of one end of the gyro casing showing the means for compensating for the earth's rotation.

Fig. 8 is a vertical section through the timing means for energizing the lights of Fig. 5.

Fig. 9 is a bottom view of the Fig. 8 apparatus.

Fig. 10 is a modified form of a portion of a gyro equipment designed to be substituted for the gyro of Fig. 3.

Fig. 11 is a bottom view of the contact block and trolley of Fig. 10.

Referring to the drawings I have disclosed a testing device in the form of a casing 10 adapted to be attached to one end of a cable 11 preferably through a swivel joint 12 so that twisting of the cable does not affect the casing 10 and is adapted to be lowered within the bore-hole 15. The casing 10 contains apparatus therein about to be described for periodically making records of the inclination of the bore-hole, its direction in azimuth, if any, and also the time. On the outside of the bore-hole, preferably on the same apparatus which supports the cable reel, I may provide a time-piece 16 which is synchronized with the time-piece within the casing 10 so that if the time on time-piece 16 is noted at predetermined intervals the various factors mentioned above, that is, inclination of the bore-hole and its direction in azimuth at predetermined depths, can be ascertained, since the depth can readily be determined by noting an indicating means, such as reel 17. The time 16 and the indication of reel 17 gives the depth at any instant and the same time on the permanent record gives the inclination of the bore-hole and the position in azimuth at the said depth.

Within the casing 10 I provide the mechanism for making a simultaneous record of the three factors—time, inclination, and position in azimuth. The said simultaneous record is adapted to be made upon a photographic film 20 which is drawn off one reel R and wound upon another reel R' in a step-by-step movement, which may be accomplished by means of a motor M which drives through suitable gearing 21 to 25, inclusive, a Geneva gear 26 which will periodically shift the said photographic film 20 to bring a new frame into position beneath the gate 27. The inclination of the bore-hole may be determined by means of a pendulum or a bubble tube B whose position is adapted to be focused upon the photographic film by means of a light 30 whose beams are concentrated by a lens system 31—32 into a converging beam which enters the camera C and throws an image upon the photographic film in position beneath gate 27. At the same time the position of the bore-hole in azimuth, as indicated by a pointer P carried at upper end of a gyroscopic mechanism about to be described and the time as indicated by a clock T (see Fig. 4), is adapted to be focused upon the other side of the photographic film in position beneath gate 27 by means of a lens system within focusing member 35. The said position of pointer P with respect to the azimuth scale S and the image of time piece T are adapted to be illuminated by means such as a light 36. The photographic film is preferably of the double sensitized type, that is, where both sides are sensitized. There will thus be projected upon the photographic frame in position beneath the gate 27 a composite image of the position in azimuth, the time, and the inclination. The Geneva gear 26 is adapted to move successive frames of a motion picture strip into position beneath gate 27 at predetermined intervals depending upon the speed of motor M and the ratio of gearing, as for instance, one frame each two and one half seconds.

It is desired, of course, that the photographic impression be made as soon as a new frame of film is in position. For this purpose there may be provided a shutter, or else the lights 30 and 36 may be illuminated for a period long enough to form an image upon the sensitized film, for if the lights 30 and 36 burned continuously there would be need for shutter mechanism. Means is, therefore, provided for rendering said lights periodically effective for a predetermined interval as each new photographic frame is moved into image receiving position. For this purpose I may utilize the same motor M driving through suitable gearing indicated in Figs. 8 and 9 as 41 to 46 inclusive for rotating a circuit-closing member 50 carrying a plurality of circuit-closing elements 51 which are designed to engage a lever 53 to operate the same in a direction to close contacts 54 for a predetermined instant and then pass beyond said lever 53 to allow the latter to be spring-pressed to ineffective position. It will be understood that the gearing is so synchronized that contacts 54 engage immediately after a photographic frame has been brought to image receiving position beneath gate 27.

The means for yielding an indication of the position of the bore-hole in azimuth is disclosed in detail in Fig. 3 and in a modified form in Fig. 10. In the Fig. 3 form a gyroscope with horizontal spinning axis is mounted within a casing 60, which is in turn mounted upon a horizontal axis 61 at right angles to the spinning axis within a vertical frame 62 mounted for movement about a vertical axis 63 by means of trunnions journaled within suitable bearings fixed to the casing. The upper end of the upper trunnion bears the pointer P which is adapted to cooperate with a compass card 68 fixed to the casing. The time-piece T may be positioned slightly below the said pointer P on a fixed base so as not to interfere with the movement of said pointer. The gyroscope is carefully balanced about its horizontal and vertical axes by means of a weight 70 carried by the casing 60 and whose movement on the threaded stem 71 is adapted to balance the device about the horizontal axis 61. Weights 72 may be applied to either side of frame 62 also on threaded stems 73 so as to balance the gyroscope and its supporting ring about the vertical axis. A gyroscope so balanced will maintain its position in azimuth with but very little deviation for a considerable time and is not subject to any marked acceleration pressures which usually affect the pendulous gyros. This permits a very rapid lowering of the testing apparatus within the bore-hole and the said rapidity of testing also insures a minimum of error in the indication of the gyro 60.

The current for driving the gyro and for operating motor M may be provided by means of a plurality of supporting batteries B contained in the lower end of the casing, preferably in a separate compartment 10' at the lower end thereof, which may be detached from the upper compartment 10'' when desired without disassembling the remaining apparatus. Current to the gyro may be led through hollow vertical trunnions 63 as shown in Figs 3 and 6 and by brush contact 80 at the outer ends of the horizontal trunnions 61. Said brush contact and the extremely flexible current conducting means 81 permit current to be supplied to said gyroscopic means without applying torque thereto.

Since the earth rotates from beneath the gyro at a definite rate in a given latitude, weight 70 may be so adjusted as to precess the gyro in the opposite direction at a predetermined rate to compensate for the said rotation of the earth. This, however, while maintaining the gyro axis relatively fixed in azimuth, may result in slight tilting of the gyro axis which, when accompanied by a substantial inclination of the bore-hole, may yield a virtual displacement of the gyro axis from its true position in azimuth. Correction may be made for this, but it may be desired to automatically maintain the gyro axis horizontal. For this purpose I may provide the modified form of gyroscopic baseline indicated in Figs. 10 and 11 wherein a pendulum 100 is mounted upon the horizontal gyro axis 61 by means of a self-aligning bearing 101 which allows the pendulum to hang vertical by swinging in the plane of the paper when there is inclination of the bore-hole and will at all times indicate true vertical in a plane perpendicular to the paper, that is, in the plane of inclination of the gyro axis. Thus, when there is inclination of the gyro axis in a plane perpendicular to the paper, there will be relative movement between a contact block 102 carried by the gyro case and a trolley 103 carried by the pendulum 100. The said trolley normally rests upon an insulation strip 104 (see Fig. 11), but upon inclination of the gyro case in one direction or the other will engage live contact segment 105 or 106 to energize the oppositely wound field coil 110 fixed to the casing to apply a torque in one direction or the other to an armature 111 fixed to the trunnion 63. This torque about the vertical axis will be in such direction as to cause the gyro to precess about the horizontal axis so as to return the gyro axis to the horizontal. The dotted positions of the trolley 103 in Fig. 11 indicate the limits of the positions which said trolley may occupy due to inclination of the bore-hole in the plane of the paper without, however, affecting the relative positions of the trolley and the insulating and contact segments.

Having described my invention, what I claim and desire to secure by Letters Patent is:

1. An apparatus for ascertaining the inclination of an oil well comprising means for indicating the degree of inclination, means for indicating the direction of inclination, means for indicating the time, and automatic means for photographically recording the indications of each of said means at spaced intervals within the well, the recording being accomplished by a simultaneous exposure of each of said means to the photographically recording means.

2. A method of ascertaining the inclination of an oil well from the vertical characterized by the employment of means for simultaneously photographing indications of the degree of the inclination, the direction of the inclination, and the time of exposure; the method comprising successively photographing in the well at spaced intervals the simultaneous indications of each of said indicating means.

3. A well surveying device comprising a casing adapted to enter a bore-hole, and recording mechanism within said casing, said mechanism including means for indicating the degree of inclination of the bore-hole, means for indicating the direction of inclination, means for indicating the time, and automatic means for simultaneously photographing the indications of all of said means.

4. A well surveying device comprising a casing adapted to enter a bore-hole, and recording mechanism within said casing, said mechanism including means for indicating the degree of inclination of the bore-hole, means for indicating the time, and automatic means for simultaneously photographing the indications of both of said means.

ELMER A. SPERRY, Jr.